(12) United States Patent
Benjebbour et al.

(10) Patent No.: US 8,879,468 B2
(45) Date of Patent: Nov. 4, 2014

(54) RADIO COMMUNICATION APPARATUS AND RADIO COMMUNICATION METHOD

(75) Inventors: Anass Benjebbour, Kanagawa (JP); Yukihiko Okumura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 139 days.

(21) Appl. No.: 13/190,795

(22) Filed: Jul. 26, 2011

(65) Prior Publication Data
US 2012/0026955 A1 Feb. 2, 2012

(30) Foreign Application Priority Data

Jul. 27, 2010 (JP) ................................ 2010-167700

(51) Int. Cl.
*H04W 4/00* (2009.01)
*H04B 7/04* (2006.01)
*H04B 7/06* (2006.01)
*H04B 7/02* (2006.01)

(52) U.S. Cl.
CPC .............. *H04B 7/024* (2013.01); *H04B 7/0452* (2013.01); *H04B 7/063* (2013.01)
USPC ......................................... 370/328; 370/437

(58) Field of Classification Search
USPC ................................ 370/329, 312, 315; 455/450
See application file for complete search history.

(56) References Cited

U.S. PATENT DOCUMENTS

| | | | | |
|---|---|---|---|---|
| 7,852,802 | B2 * | 12/2010 | Prasad et al. .................. | 370/328 |
| 8,320,926 | B2 * | 11/2012 | Hagerman et al. ............ | 455/450 |
| 2009/0016263 | A1 * | 1/2009 | Kishigami et al. ............ | 370/328 |
| 2009/0323574 | A1 * | 12/2009 | Koskinen et al. ............. | 370/312 |
| 2010/0035627 | A1 | 2/2010 | Hou et al. | |
| 2010/0039951 | A1 | 2/2010 | She et al. | |
| 2010/0056215 | A1 * | 3/2010 | Gorokhov et al. ............ | 455/561 |
| 2010/0085917 | A1 * | 4/2010 | Gorokhov et al. ............ | 370/328 |
| 2010/0309861 | A1 * | 12/2010 | Gorokhov et al. ............ | 370/329 |
| 2011/0261745 | A1 * | 10/2011 | Bontu et al. ................. | 370/315 |
| 2013/0028128 | A1 * | 1/2013 | Novak et al. ................. | 370/252 |

FOREIGN PATENT DOCUMENTS

EP 2 154 925 A1 2/2010

OTHER PUBLICATIONS

"3GPP TR 25.912 V 7.1.0", 3rd Generation Partnership Project; Technical Specification Group Radio Access Network; Feasibility study for evolved Universal Terrestrial Radio Access (UTRA) and Universal Terrestrial Radio Access Network (UTRAN)(Release 7), 2006, pp. 1-57.
Extended European Search Report issued Dec. 2, 2011 in European Patent Application No. 11175346.3.

(Continued)

*Primary Examiner* — Anh-Vu Ly
(74) *Attorney, Agent, or Firm* — Oblon, Spivak, McClelland, Maier & Neustadt, L.L.P.

(57) ABSTRACT

A radio communication apparatus and radio communication method are provided which coordinates a plurality of radio base station apparatuses in consideration of interference cancelling capability of mobile terminal apparatuses, and can thereby improve the throughput of the entire system even when the amount of information shared among a plurality of radio base station apparatuses is small. In a system that performs multicell coordinated transmission in downlink, a radio communication method according to the present invention selects a set of mobile terminal apparatuses whose interference can be cancelled from a plurality of mobile terminal apparatus, when a plurality of radio base station apparatuses perform joint scheduling, using interference cancelling capability information fed back from each mobile terminal apparatus; then performs joint scheduling for the set of selected mobile terminal apparatuses.

8 Claims, 8 Drawing Sheets

(56) References Cited

OTHER PUBLICATIONS

LG Electronics Inc., "System level performance with CoMP JT", 3GPP TSG RAN WG1 Meeting #60, R1-101355, XP050419033, Feb. 19, 2010, pp. 1-6.

Stefan Brueck, et al., "Centralized Scheduling for Joint Transmission Coordinated Multi-Point in LTE-Advanced", 2010 International ITG Workshop on Smart Antennas, XP031663710, Feb. 23, 2010, pp. 177-184.

Motorola, "SCF-based Coordinated Beamforming and Performance Gain over Single-Point SU/MU Beamforming", 3GPP TSG RAN1#59, R1-094848, XP050389236, Nov. 9, 2009, pp. 1-11.

* cited by examiner

RADIO COMMUNICATION APPARATUS AND RADIO COMMUNICATION METHOD

CROSS REFERENCE TO RELATED APPLICATION

This application is based upon and claims the benefit of priority from the prior Japanese Patent Application No. 2010-167700, filed on Jul. 27, 2010; the entire contents of which are incorporated herein by reference.

BACKGROUND OF THE INVENTION

1. Field of the invention

The present invention relates to a radio communication apparatus and radio communication method concerning downlink CoMP transmission (Coordinated Multiple Point transmission).

2. Description of the Related Art

An LTE (Long Term Evolution) system (3GPP, TR25.912 (V7.1.0), "Feasibility study for Evolved UTRA and UTRAN", Sept. 2006) defined in 3GPP ($3^{rd}$ Generation Partnership Project) adopts OFDMA (Orthogonal Frequency Division Multiple Access) for downlinks. Thus, through scheduling by a radio base station apparatus, certain frequency and time radio resources are basically allocated to one mobile terminal apparatus (UE: User Equipment), and therefore users in the same cell are orthogonal to each other in the frequency and time domains. However, since the LTE cellular system is based on frequency reuse one, large interference is received from surrounding cells and the interference level at a UE located in a cell edge is particularly high. Measures against inter-cell interference are required to compensate for such peripheral cell interference and maintain constant receiving quality.

3GPP is studying an LTE-A (LTE-Advanced) system to realize high-speed transmission with broader coverage than the LTE cellular system. The LTE-A (LTE-Advanced) system adopts a coordinated multiple point transmission/reception (CoMP) technique as an additional inter-cell interference control (ICIC). There are two methods for realizing the CoMP technique; autonomous distributed control based on an independent eNB (eNode B) configuration (inter-eNB coordination) and concentrated control based on a remote base station (RRE: Remote Radio Equipment) configuration (intra-eNB coordination). The independent eNB configuration requires signaling through a wired transmission path (X2 interface) between eNBs as shown in FIG. 1.

Figure 1:
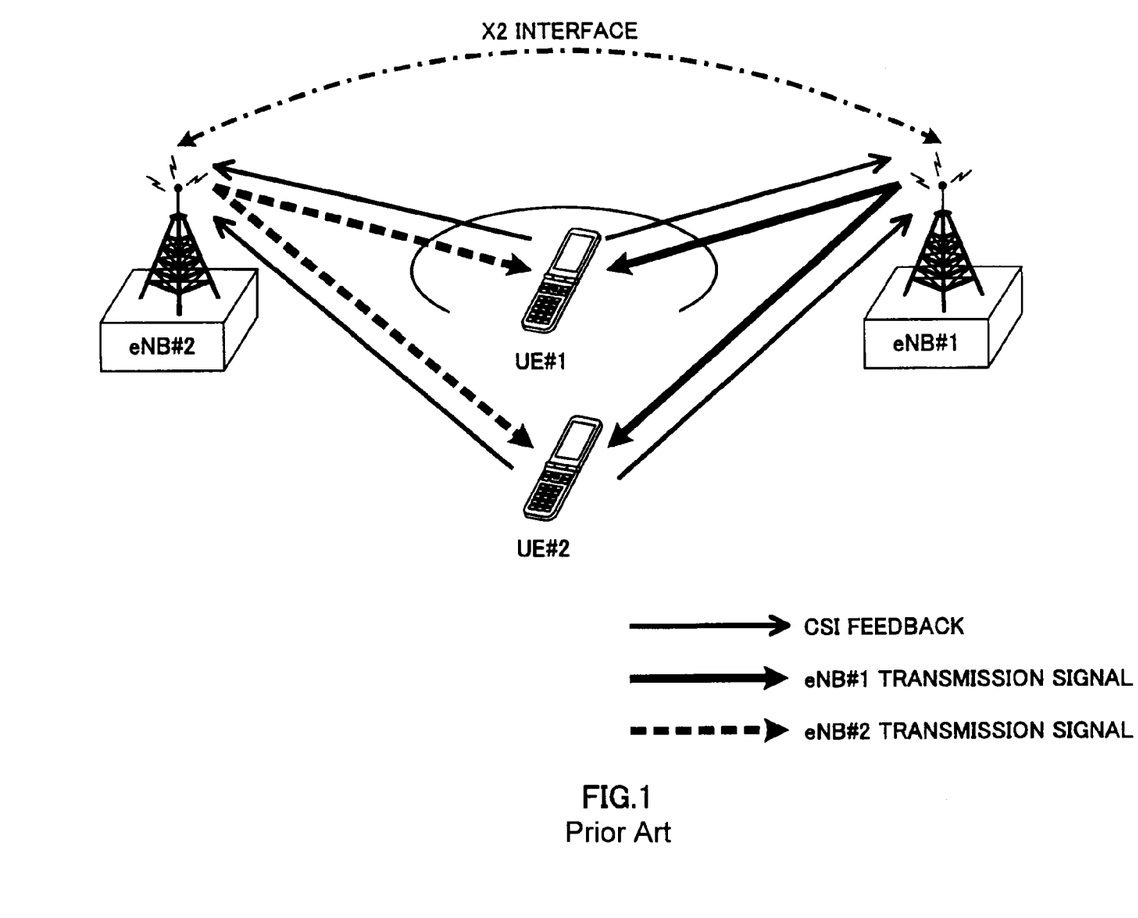
FIG. 1 is a diagram illustrating downlink coordinated transmission between base stations.

In an inter-base-station coordinated transmission system such as CoMP, data and reference signals (RS) are simultaneously transmitted, for example, on downlinks from a plurality of (here, two) radio base station apparatuses eNB#1 and eNB#2 to mobile terminal apparatuses UE#1 and UE#2 as shown in FIG. 1. Furthermore, channel information (CSI: Channel State Information) is fed back from the mobile terminal apparatus UE to the radio base station apparatus eNB.

Figure 2:
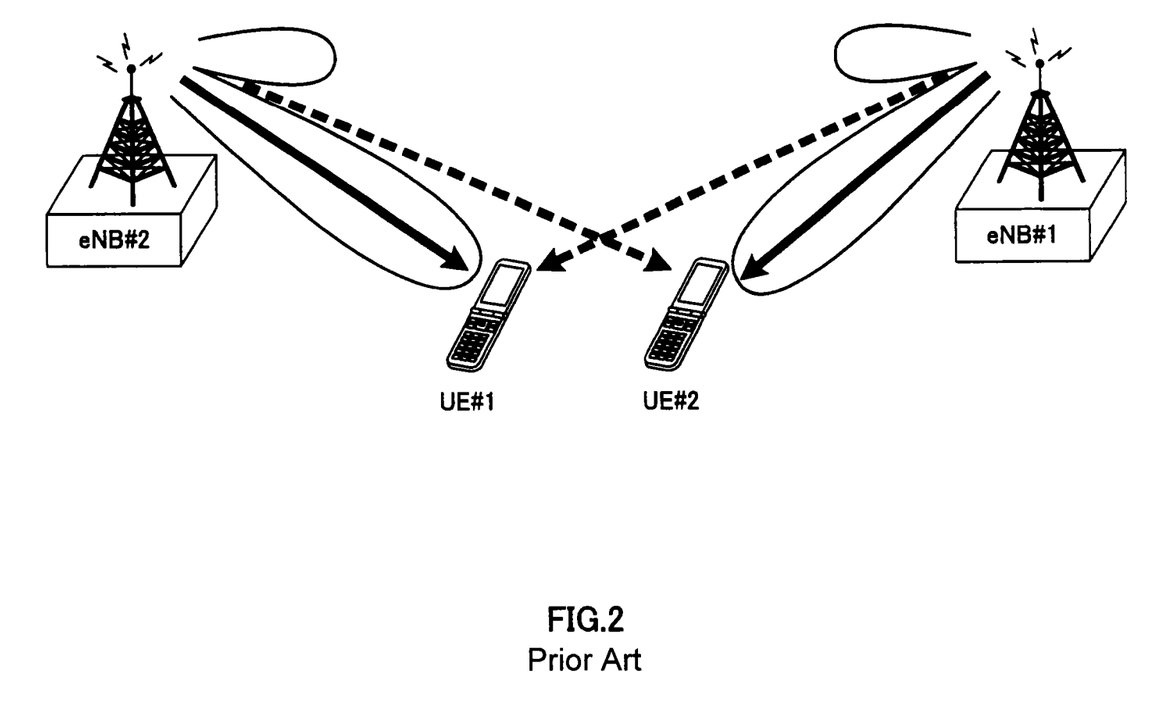
FIG. 2 is a diagram illustrating downlink coordinated transmission between base stations.
Figure 3:
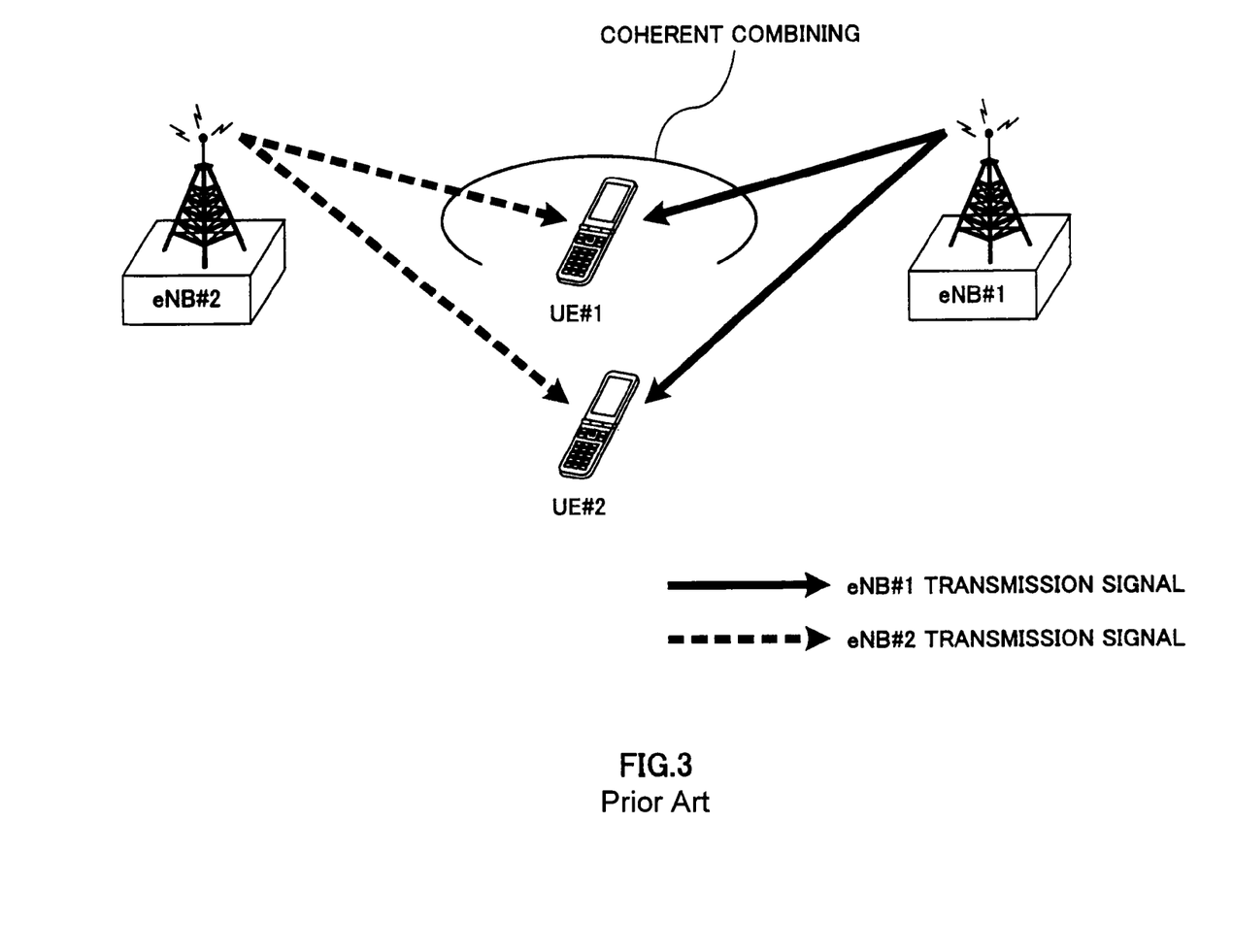
FIG. 3 is a diagram illustrating downlink coordinated transmission between base stations.

Downlink CoMP transmission can be roughly divided into two categories; CS/CB (Coordinated Scheduling/Coordinated Beamforming) shown in FIG. 2 and JP (Joint Processing) shown in FIG. 3. With CS/CB as shown in FIG. 2, data is transmitted to a specific UE (UE#1) from one cell (eNB#2) in a subframe, and beam forming and scheduling coordinated among a plurality of cells are performed so as to reduce interference with the other UE (eNB#1) in the other cell. On the other hand, with JP as shown in FIG. 3, transmission is performed simultaneously for a specific UE (UE#1 or UE#2) from a plurality of cells (eNB#1, eNB#2) using the same time and frequency radio resources (joint transmission). In this case, precoding is performed between cells and signals are in-phase combined at a receiving point (coherent combining).

With CS/CB or JP, a CSI measured value for each user is fed back to the radio base station apparatus. In this case, making the most of the effect of CoMP (avoidance of spatial interference between cells) requires spatial information of the channel to be fed back accurately from the mobile terminal apparatus. This causes the amount of feedback information from the mobile terminal apparatus to the radio base station apparatus to increase. Furthermore, in the case of coordinated transmission between a plurality of base stations as shown in FIG. 1, feedback information or data needs to be shared between the radio base station apparatuses via the X2 interface, which results in a problem that a large capacity X2 interface will be required when causing many radio base station apparatuses to coordinate with each other.

SUMMARY OF THE INVENTION

The present invention has been implemented in view of the above problems and it is an object of the present invention to provide a radio communication apparatus and radio communication method that coordinates a plurality of radio base station apparatuses in consideration of interference cancelling capability of mobile terminal apparatuses and can thereby improve the throughput of the entire system even when the amount of information shared among the plurality of radio base station apparatuses is small.

A radio communication apparatus according to the present invention is a radio communication apparatus in a system that performs multicell coordinated transmission in downlink, including a selecting section configured to select a set of mobile terminal apparatuses whose interference can be cancelled from a plurality of mobile terminal apparatus when a plurality of radio base station apparatuses perform joint scheduling using interference cancelling capability information fed back from each mobile terminal apparatus and a scheduling section configured to perform joint scheduling for the set of mobile terminal apparatuses.

A radio communication method according to the present invention is a radio communication method in a system that performs multicell coordinated transmission in downlink, including a step of selecting a set of mobile terminal apparatuses whose interference can be cancelled from a plurality of mobile terminal apparatus when a plurality of radio base station apparatuses perform joint scheduling using interference cancelling capability information fed back from each mobile terminal apparatus and a step of performing joint scheduling for the set of selected mobile terminal apparatuses.

DETAILED DESCRIPTION OF THE INVENTION

Hereinafter, an embodiment of the present invention will be described in detail with reference to the accompanying drawings.

The aforementioned inter-eNB coordination technique can avoid interference between coordinating radio base station apparatuses, but interference cancelling capability on the mobile terminal apparatus side is not considered. Since a channel measurement result of the downlink is fed back to the mobile terminal apparatus, if the mobile terminal apparatus side has interference cancelling capability, the mobile terminal apparatus side preferably cancels interference. For this reason, an inter-cell interference control (ICIC) technique making full use of the capability of the mobile terminal apparatus side becomes important.

The inventors noticed the inter-cell interference control technique making use of the capability of the mobile terminal apparatus side, discovered that it should be possible to improve the system throughput by performing scheduling between radio base station apparatuses in consideration of the capability of the mobile terminal apparatus side and came up with the present invention. In the inter-cell interference control according to the radio communication method of the present invention, the network side assists scheduling between radio base station apparatuses and the mobile terminal apparatuses actually cancel interference.

Thus, since the network side performs scheduling between the radio base station apparatuses based on the capability of the mobile terminal apparatus, it is possible to reduce information fed back from the mobile terminal apparatus to the radio base station apparatus and also reduce information shared between the radio base station apparatuses. This makes it possible to realize coordination between base stations without the necessity of introducing a large capacity X2 interface and improve the throughput of the entire system.

That is, the essence of the present invention is to use, in a system that performs multicell coordinated transmission in downlink, interference cancelling capability information fed back from each mobile terminal apparatus, select a set of mobile terminal apparatuses whose interference can be cancelled from, when a plurality of radio base station apparatuses perform joint scheduling, among the mobile terminal apparatuses that have fed back the interference cancelling capability information and perform joint scheduling for the selected set of mobile terminal apparatuses and thereby improve the throughput of the entire system.

Here, the capability of the mobile terminal apparatus to be considered when performing scheduling between the radio base station apparatuses will be described. Examples of the capability of a mobile terminal apparatus may include the number of antennas and degree of delay tolerance or the like.

For example, the number of antennas installable on a mobile terminal apparatus varies. Many antennas are arranged on a mobile terminal apparatus requiring a high data rate. Therefore, the mobile terminal apparatus including many antennas has high space degrees of freedom and it is possible to cancel interference from other cells taking advantage of these space degrees of freedom. That is, a mobile terminal apparatus including many antennas is a mobile terminal apparatus with high space degrees of freedom (spatial interference cancelling capability).

Furthermore, the tolerable delay varies depending on the application of a mobile terminal apparatus. An application that allows a long delay results in having a high time degrees of freedom and it is possible to cancel interference from other cells taking advantage of the time degrees of freedom. That is, a mobile terminal apparatus that tolerates a long delay is a mobile terminal apparatus having high time degrees of freedom (time interference cancelling capability).

Figure 4:
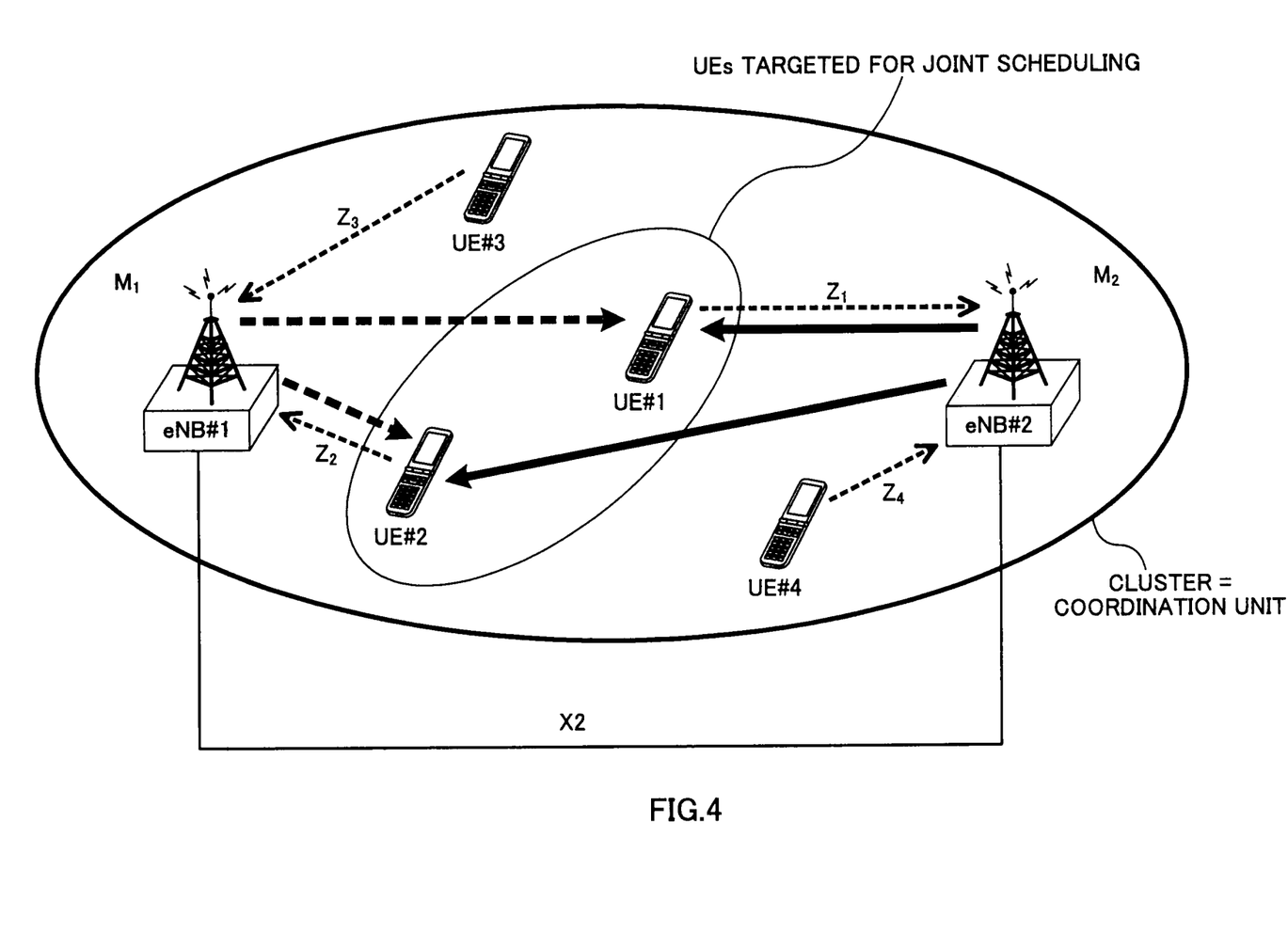
FIG. 4 is a diagram illustrating downlink coordinated transmission between base stations according to the present embodiment.

Next, scheduling between radio base station apparatuses in consideration of the capability on the mobile terminal apparatus side in a system that performs multicell coordinated transmission in downlink, that is, joint scheduling according to the present invention will be described using FIG. 4. FIG. 4 is a diagram illustrating coordinated transmission between base stations according to the embodiment of the present invention.

In FIG. 4, radio base station apparatuses eNB#1 and eNB#2 constitute a coordination unit (cluster) for performing multicell coordinated transmission in downlink. Mobile terminal apparatuses UE#1, UE#2, UE#3 and UE#4 are present within this coordination unit. First, interference cancelling capability information Z of each mobile terminal apparatus UE#1 to UE#4 is fed back from each mobile terminal apparatus to the radio base station apparatus eNB#1 or eNB#2 which is the connection destination. That is, the mobile terminal apparatus UE#1 feeds back interference cancelling capability information $Z_1$ to the radio base station apparatus eNB#2, the mobile terminal apparatus UE#2 feeds back interference cancelling capability information $Z_2$ to the radio base station apparatus eNB#l, the mobile terminal apparatus UE#3 feeds back interference cancelling capability information $Z_3$ to the radio base station apparatus eNB#1 and the mobile terminal apparatus UE#4 feeds back interference cancelling capability information $Z_4$ to the radio base station apparatus eNB#2. Here, interference cancelling capability information $Z_i$ (i=1, 2, 3, 4) is a degree of freedom (space degree of freedom and/or time degree of freedom) used to separate a desired signal from an interference signal. The interference cancelling capability information $Z_i$ may be dynamically fed back or quasi-statically fed back.

Next, interference cancelling capability information $Z_1$ to $Z_4$ and information of the number of streams transmitted to each mobile terminal apparatus are shared and centralized at the radio base station apparatuses eNB#1 and eNB#2 or node such as a central station. The radio communication apparatus (radio base station apparatus or node) which has centralized the information searches or selects a set of mobile terminal apparatuses targeted for joint scheduling. That is, any one of the radio base station apparatuses eNB#1 and eNB#2 or a node such as the central station selects a set of mobile terminal apparatuses targeted for joint scheduling (joint scheduling target) from among the mobile terminal apparatuses UE#1 to UE#4 which fed back the interference cancelling capability information $Z_1$ to $Z_4$. In FIG. 4, the mobile terminal apparatuses UE#1 and UE#2 are selected as a set of mobile terminal apparatuses. In this case, a set of mobile terminal apparatuses is selected within a range that does not exceed the degrees of freedom of each mobile terminal apparatus UE#1, UE#2 targeted for joint scheduling (range within which the receiving side can cancel interference even when scheduling is performed simultaneously). After that, any one of the radio base station apparatuses eNB#1 and eNB#2 or node such as a central station performs joint scheduling for the set of mobile terminal apparatuses.

Following are descriptions of how to make use of interference cancelling capability information (space degrees of freedom and/or time degrees of freedom) when selecting a set of mobile terminal apparatuses.

(1) Use of Space Degrees of Freedom (Use of Spatial Signal Separation Capability per Mobile Terminal Apparatus)

Assuming $Z_i=N_i$ to be a space degree of freedom (e.g., the number of uncorrelated antennas or the number of independent eigenmodes), if the UE#m is connected to the eNB#1 and the UE#n is connected to the eNB#2, for a set of mobile terminal apparatuses in which $M_{1,m}+M_{2,n} \leq Z_m$, and $M_{1,m}+M_{2,n} \leq Z_n$ hold true, their respective mobile terminal apparatus sides can separate a desired signal from an interference signal. Therefore, a set of mobile terminal apparatuses (m, n) that satisfy a condition of $M_{1,m}+M_{2,n} \leq \min(Z_m, Z_n)$ is searched and joint scheduling is performed. $M_{1,m}$ is the number of independent substreams to be sent from the eNB#1 to the UE#m during MIMO (Multiple Input Multiple Output) transmission and $M_{2,n}$ is the number of independent substreams to be sent from the eNB#2 to the UE#n during MIMO transmission.

(2) Use of Time Degrees of Freedom (Use of Processing Capability Owing to Delay Tolerance per Mobile Terminal Apparatus)

When the delay tolerable by an application on an $i^{th}$ mobile terminal apparatus side is $\tau_i$ and $T_{re}$ is a time necessary for retransmission (packet retransmission) and a channel of a mobile terminal apparatus is uncorrelated among packets, a time degree of freedom $k_i$ is given by $k_i=\text{floor}\{\tau_i/T_{re}\}$.

Therefore, since the time degrees of freedom of the $i^{th}$ mobile terminal apparatus is $k_i$, $Z_i=k_i$. In this case, a set of mobile terminal apparatuses (m, n) that satisfies a condition of $M_{1,m}+M_{2,n} \leq \min(k_m, k_n)$ is searched and joint scheduling is performed. $M_{1,m}$ is the number of independent substreams to be sent from the eNB#1 to the UE#m during MIMO (Multiple Input Multiple Output) transmission and $M_{2,n}$ is the number of independent substreams to be sent from the eNB#2 to the UE#n during MIMO transmission. Here, floor (x) is a floor function that returns the largest integer which is smaller than x.

(3) Use of Time Degrees of Freedom and Space Degrees of Freedom (Time Degrees of Freedom Owing to Delay Tolerance per Mobile Terminal Apparatus and Use of Space Degree of Freedom Related to Spatial Processing at Mobile Terminal Apparatus)

Assuming the space degrees of freedom on the $i^{th}$ mobile terminal apparatus side is $N_i$, tolerable delay by an application on the $i^{th}$ mobile terminal apparatus side is $\tau_i$, $T_{re}$ is a time necessary for retransmission (packet retransmission), and a channel of a mobile terminal apparatus is uncorrelated among packets, a time degree of freedom $k_i$ is given by $k_i=\text{floor}\{\tau_i/T_{re}\}$. Therefore, the time degrees of freedom of the $i^{th}$ mobile terminal apparatus is $k_i \times N_i$, and therefore $Z_i=k_i \times N_i$. In this case, a set of mobile terminal apparatuses (m, n) that satisfies a condition of $M_{1,m}+M_{2,n} \leq \min(k_m \times N_m, k_n \times N_n)$ is searched and joint scheduling is performed.

Thus, the present invention can perform inter-cell interference control taking advantage of the interference cancelling capability of the mobile terminal apparatus. Particularly, since a mobile terminal apparatus having a high time degree of freedom and/or space degree of freedom (high interference cancelling capability) is selected for at least one of mobile terminal apparatuses targeted for joint scheduling, spatial inter-cell interference control is possible even when the mobile terminal apparatus is paired with another mobile terminal apparatus. Furthermore, with such a method, the interference cancelling capability needs only to be fed back once from the mobile terminal apparatus and need not be fed back in RB (Resource Block) units as in the case of CSI information. Thus, the amount of feedback information from the mobile terminal apparatus can be reduced. Furthermore, according to the present invention, since interference cancellation is basically performed by the mobile terminal apparatus, the network side need not cancel or control interference through precoding or the like. For this reason, it is possible to reduce information necessary to cancel or control interference, that is, information shared between radio base stations eNB via the X2 interface. As a result, the throughput of the entire system can be improved through coordinated transmission between base stations.

When selecting a mobile terminal apparatus targeted for joint scheduling, if there are a plurality of sets of mobile terminal apparatuses, the present invention may select the set of mobile terminal apparatuses according to other scheduling references. Examples of the other scheduling references include proportional fairness and sum rate maximization.

Furthermore, when selecting a mobile terminal apparatus targeted for joint scheduling, the present invention may change the coordination unit of multicell coordinated transmission in downlink depending on whether the set of mobile terminal apparatuses is present or not. When, for example, there is no set of mobile terminal apparatuses targeted for joint scheduling when making use of the above described time degrees of freedom and/or space degrees of freedom, the interference cancelling capability on the mobile terminal side is insufficient, and therefore the coordination unit (cluster size) is reduced. Dynamically changing the coordination unit in this way enables the cluster size to be made variable. The coordination unit (cluster size) can be identified by the number of radio base station apparatuses targeted for joint scheduling.

Figure 5:
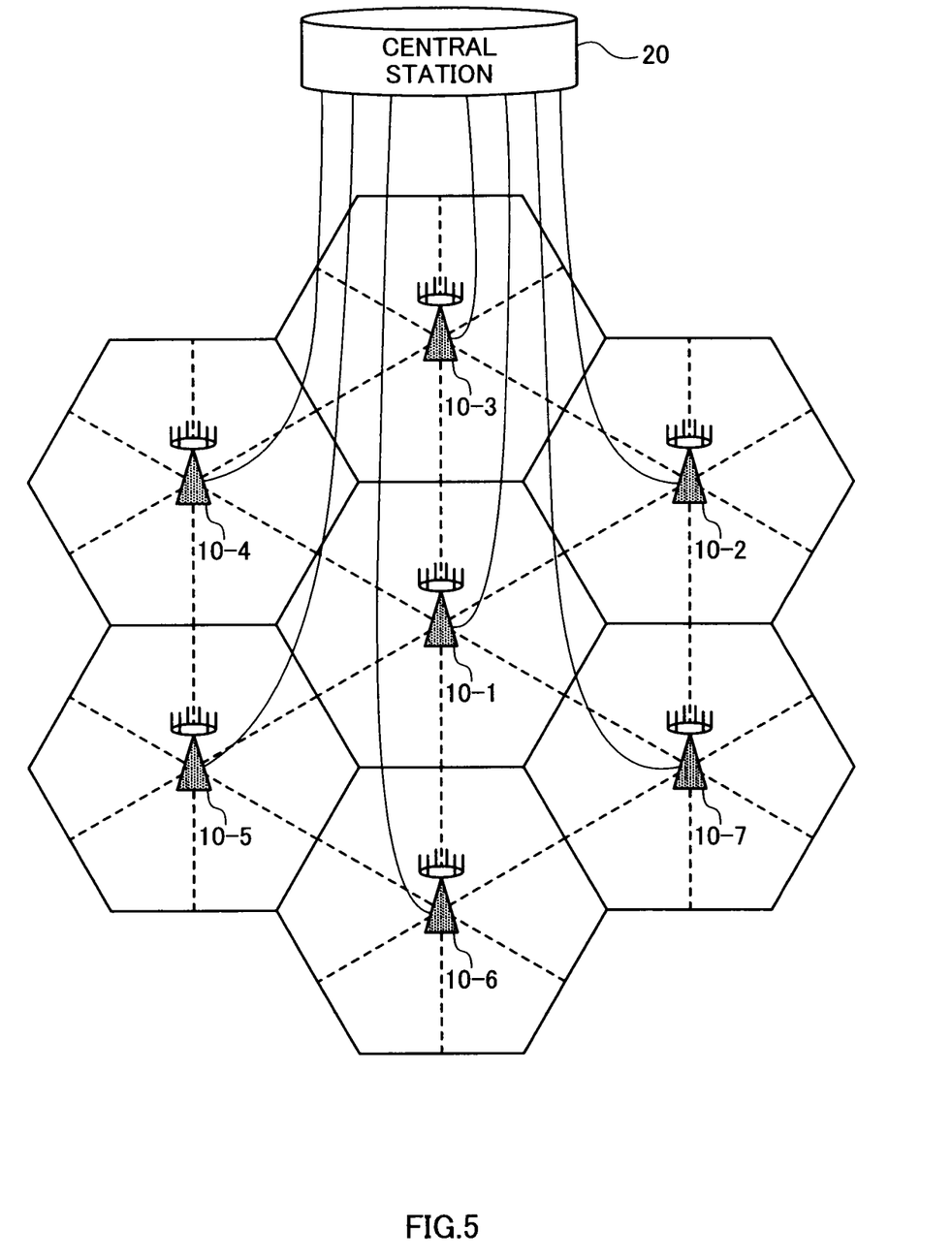
FIG. 5 is a diagram illustrating a radio communication system performing a radio communication method according to the present embodiment.

FIG. 5 is a diagram illustrating a radio communication system including the radio communication apparatuses according to the embodiment of the present invention.

The radio communication system includes a plurality of cells employing an independent eNB configuration as shown in FIG. 5. In the respective cells, mobile terminal apparatuses UE are accommodated under the control of radio base station apparatuses eNB 10-1 to 10-7 respectively. Furthermore, eNBs 10-1 to 10-7 of the respective cells are connected to a central station 20 which is a radio communication apparatus. The central station 20 centralizes interference cancelling capability information sent from each mobile terminal apparatus, selects a set of mobile terminal apparatuses whose interference can be cancelled on the receiving side even when a plurality of radio base station apparatuses perform scheduling simultaneously from among mobile terminal apparatuses that fed back the interference cancelling capability information and performs scheduling for the selected set of mobile terminal apparatuses. Although FIG. 5 describes a case where the central station has the function of using interference cancelling capability information, selecting a set of mobile terminal apparatuses whose interference can be cancelled on the receiving side even when a plurality of radio base station apparatuses perform scheduling simultaneously and performing scheduling for the selected set of mobile terminal apparatuses, the present invention is not limited to this, but one radio base station apparatus may have the above-described function.

This radio communication system is a system to which, for example, E-UTRA (Evolved UTRA and UTRAN) is applied.

In the radio communication system, OFDM (orthogonal frequency division multiple access) is applied to downlinks and SC-FDMA (single carrier frequency division multiple access) is applied to uplinks as the radio access schemes. OFDM is a multicarrier transmission scheme for carrying out communication by dividing a frequency band into a plurality of narrow frequency bands (subcarriers) and mapping data to each subcarrier. SC-FDMA is a single carrier transmission scheme for reducing interference between mobile terminal apparatuses by dividing a frequency band into portions corresponding to the respective terminals and the plurality of mobile terminal apparatuses using different frequency bands.

Next, a traffic channel in E-UTRA will be described. For downlinks, physical downlink shared channel (PDSCH) and physical downlink control channel (PDCCH) shared between mobile terminal apparatuses are used. The physical downlink control channel is also called "downlink L1/L2 control channel." User data, that is, an ordinary data signal is transmitted through the above-described physical downlink shared channel. Furthermore, downlink scheduling information (DL Scheduling Information), delivery acknowledgement information (ACK/NACK), uplink scheduling grant (UL Scheduling Grant), TPC command (Transmission Power Control Command) or the like are transmitted through the physical downlink control channel. The downlink scheduling information includes, for example, an ID of a user who carries out communication using a physical downlink shared channel, information of the transport format of the user data, that is, information of data size, modulation scheme, retransmission control (HARQ: Hybrid ARQ) and allocation information of downlink resource blocks or the like.

Physical uplink shared channel (PUSCH) and physical uplink control channel (PUCCH) shared by the respective mobile terminal apparatuses are used for uplinks. User data, that is, an ordinary data signal is transmitted through the above-described physical uplink shared channel. Furthermore, downlink channel quality information (CQI: Channel Quality Indicator) to be used for scheduling processing and adaptive modulation/demodulation and coding processing (AMC: Adaptive Modulation and Coding scheme) for a shared physical channel in downlink, delivery acknowledgement information of a physical downlink shared channel and feedback (feedback index or the like) of channel information necessary for MIMO precoding transmission are transmitted through the physical uplink control channel.

In the present invention, since the connected base station is fed back information of the interference cancelling capability on the mobile terminal side in addition to feedback information necessary for MIMO precoding transmission, less feedback information is required for coordination compared to a system in which base stations are coordinated through precoding of a plurality of base stations so that the transmitting side avoids interference.

Figure 6:
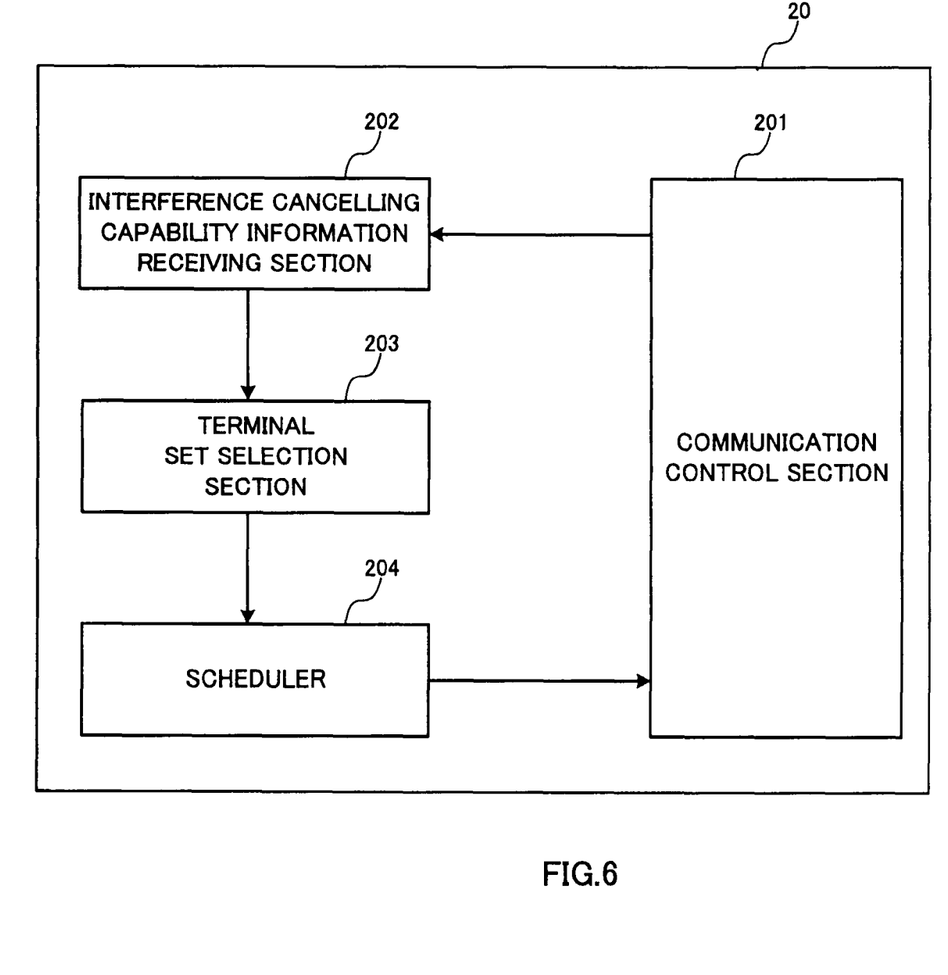
FIG. 6 is a diagram illustrating a configuration of a radio communication apparatus in the radio communication system shown in FIG. 5.

FIG. 6 is a diagram illustrating a configuration of the central station in the radio communication system shown in FIG. 5.

A central station 20 shown in FIG. 6 is mainly constructed of a communication control section 201, an interference cancelling capability information receiving section 202, a terminal set selection section 203 and a scheduler 204.

The communication control section 201 controls transmission/reception of data and information between the radio base station apparatuses eNB 10-1 to 10-7. The interference cancelling capability information receiving section 202 receives (or centralizes), from the radio base station apparatuses eNB 10-1 to 10-7, interference cancelling capability information fed back to the radio base station apparatuses eNB 10-1 to 10-7 from the respective mobile terminal apparatuses and outputs interference cancelling capability information to the terminal set selection section 203.

The terminal set selection section 203 selects a set of mobile terminal apparatuses whose interference can be cancelled on the receiving side (mobile terminal apparatus side) even when a plurality of radio base station apparatuses perform scheduling simultaneously from among the mobile terminal apparatuses that feed back the interference cancelling capability information based on the interference cancelling capability information fed back from each mobile terminal apparatus. The terminal set is selected using the time degrees of freedom and/or space degrees of freedom (terminal capability) as described above. The terminal set selection section 203 outputs information of the selected terminal set to the scheduler 204.

The scheduler 204 performs scheduling for the selected terminal set. That is, the scheduler 204 performs joint scheduling so as to realize the technique of coordination between base stations using autonomous distributed control (coordination between base stations) based on an independent base station configuration. The scheduler 204 outputs the scheduling information to a selected radio base station apparatus.

Figure 7:
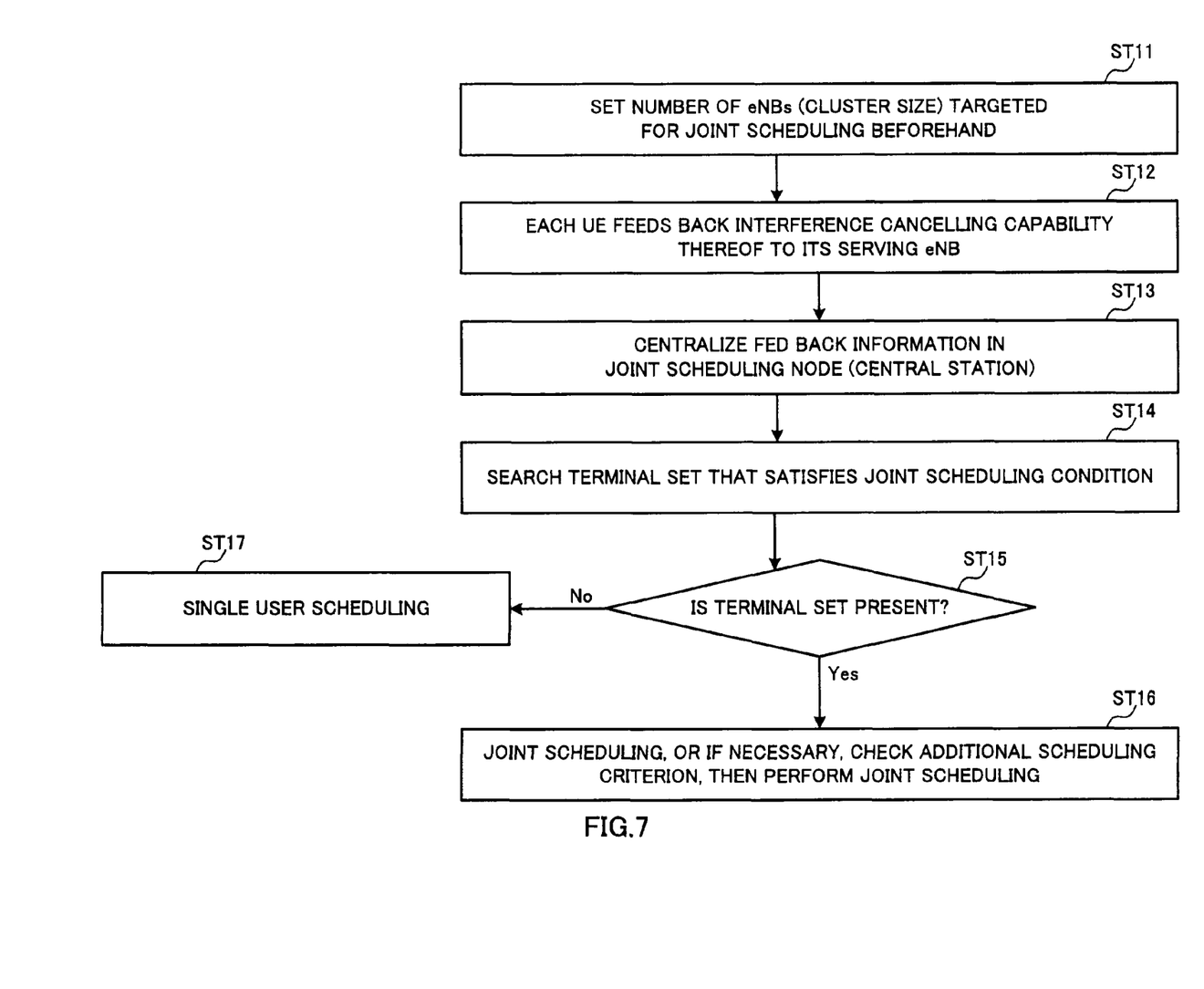
FIG. 7 is a flowchart for illustrating the radio communication method according to the present embodiment.
Figure 8:
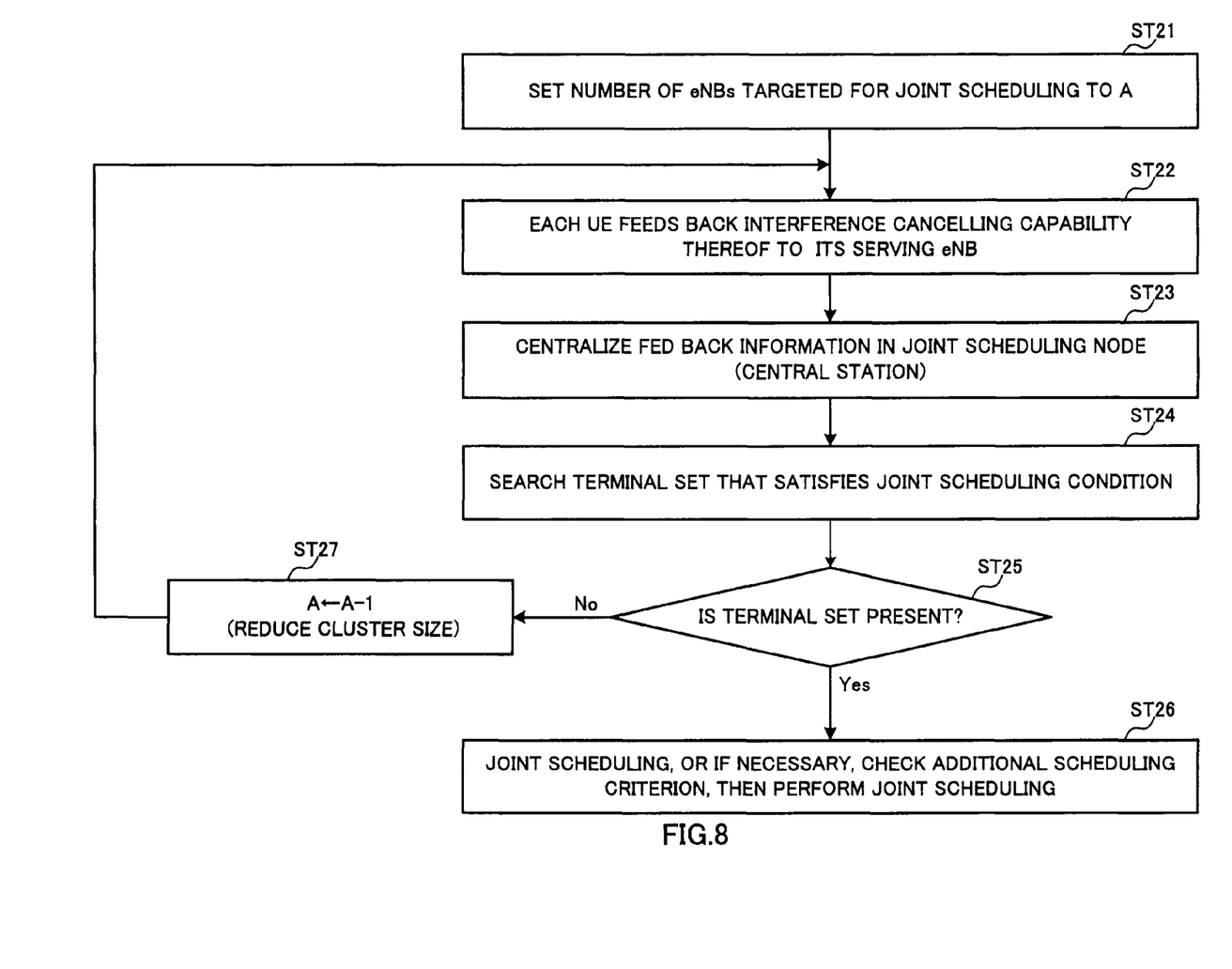
FIG. 8 is a flowchart for illustrating another example of the radio communication method according to the present embodiment.

Next, the radio communication method according to the present invention in the radio communication system in the above described configuration will be described using FIG. 7 and FIG. 8.

First, control in a fixed cluster size will be described using FIG. 7. The central station or one radio base station apparatus (eNB) sets the number of radio base stations (cluster size) that perform joint scheduling beforehand (ST11). This identifies the unit of coordination between base stations.

Each mobile terminal apparatus UE feeds back interference cancelling capability thereof to its serving radio base station apparatus eNB (ST12). The central station (joint scheduling node) then centralizes the interference cancelling capability information fed back in this way (ST13). Next, the terminal set selection section 203 of the central station searches a terminal set that satisfies a joint scheduling condition (ST14) and judges whether the terminal set is present or not (ST15). Here, the "joint scheduling condition" is a condition that does not exceed the mutual interference cancelling capabilities when the mutual degrees of freedom of the mobile terminal apparatuses are taken into consideration, that is, a condition under which interference can be cancelled on the receiving side even when a plurality of radio base station apparatuses perform scheduling simultaneously.

When the terminal set is found, the terminal set selection section 203 selects the terminal set. The scheduler 204 then outputs scheduling information so that joint scheduling is performed for the selected terminal set (ST16). If necessary, the scheduler 204 checks additional scheduling criteria before performing joint scheduling using all the scheduling criteria as required. On the other hand, if no desired terminal set is found, the scheduler 204 outputs scheduling information so that single user scheduling is performed for each mobile terminal apparatus separately (ST17).

In such a method, the interference cancelling capability needs only to be fed back once from the mobile terminal apparatus and need not be fed back in RB units as in the case of CSI information. Thus, it is possible to reduce the amount of feedback information from the mobile terminal apparatus. Furthermore, in this method, since interference is basically cancelled by the mobile terminal apparatus, the network side does not need to cancel or control interference. Thus, it is possible to reduce information necessary to cancel or control interference, that is, information shared between the radio base station apparatuses via the X2 interface. As a result, the throughput of the entire system can be improved with less feedback/sharing information during downlink coordinated transmission between base stations.

Next, control in a dynamic cluster size will be described using FIG. 8. The central station or one radio base station apparatus eNB sets the number of radio base station apparatuses (cluster size) that perform joint scheduling beforehand (ST21). This identifies the unit of coordination between the base stations.

Each mobile terminal apparatus UE feeds back the interference cancelling capability thereof to its serving radio base station apparatus eNB (ST22). The central station (joint scheduling node) centralizes the interference cancelling capability information fed back in this way (ST23). Next, the terminal set selection section 203 of the central station searches a terminal set that satisfies a joint scheduling condition (ST24) and judges whether the terminal set is present or not (ST25). Here, the "joint scheduling condition" is a condition that does not exceed the mutual interference cancelling capabilities when the mutual degrees of freedom of the mobile terminal apparatuses are taken into consideration, that is, a condition under which interference can be cancelled on the receiving side even when a plurality of radio base station apparatuses perform scheduling simultaneously.

When the terminal set is found, the terminal set selection section 203 selects the terminal set. The scheduler 204 outputs scheduling information so that joint scheduling is performed for the selected terminal set (ST26). If necessary, the scheduler 204 checks additional scheduling criteria before performing scheduling using all scheduling criteria as required. On the other hand, if no desired terminal set is found, the central station or one radio base station apparatus eNB resets the number of radio base station apparatuses targeted for joint scheduling (cluster size) A (ST27). For example, the cluster size is reduced (A←A-1).

In such a method, the interference cancelling capability needs only to be fed back once from the mobile terminal apparatus and a large amount of information need not be fed back as in the case of CSI information. Thus, it is possible to reduce the amount of feedback information from the mobile terminal apparatus. Furthermore, in this method, since interference is basically cancelled by the mobile terminal apparatus, the network side need not cancel or control interference. Thus, it is possible to reduce information necessary to cancel or control interference, that is, information shared between the radio base station apparatuses via the X2 interface. As a result, the throughput of the entire system can be improved during coordinated transmission between base stations. Furthermore, according to this method, the cluster size can be dynamically changed and the cluster size can thereby be adjusted so that interference can be cancelled in the mobile terminal apparatus targeted for joint scheduling according to the interference cancelling capability of the mobile terminal apparatus connected.

The present invention is not limited to the above embodiment, but can be implemented with various changes. Although a case has been described in the above embodiment where there are two radio base station apparatuses and four mobile terminal apparatuses, the present invention is not limited to this, but is also applicable to cases where there are other numbers of radio base station apparatuses and mobile terminal apparatuses. Furthermore, the technique of the present invention can be implemented in combination with existing inter-cell interference control techniques as appropriate. Furthermore, the present invention can be implemented by changing the number of processing sections and processing procedure in the above description as appropriate without departing from the scope of the present invention. Furthermore, each element illustrated shows a function and each function block may be implemented by hardware or software. In addition, the present invention can be implemented with changes as appropriate without departing from the scope of the present invention.

What is claimed is:

1. A radio communication apparatus in a system that performs multicell coordinated transmission in a downlink, comprising:
a selecting circuitry configured to select a set of mobile terminal apparatuses whose interference is cancelable from a plurality of mobile terminal apparatuses when a plurality of radio base station apparatuses perform joint scheduling using interference cancelling capability information fed back from each mobile terminal apparatus; and
a scheduling circuitry configured to perform joint scheduling for the set of mobile terminal apparatuses,
wherein the selecting circuitry selects the set of mobile terminal apparatuses based on an interference cancelling capability of each mobile terminal apparatus,
a size of a coordination unit of the multicell coordinated transmission in the downlink is dynamically adjusted to cancel the interference, the size of the coordination unit corresponding to a number of radio base stations targeted for joint scheduling, and
when the set of mobile terminal apparatuses does not meet a joint scheduling condition, the size of the coordination unit is reset and reduced by at least one.

2. The radio communication apparatus according to claim 1, wherein the selecting circuitry selects the set of mobile terminal apparatuses based on a spatial signal separation capability of each mobile terminal apparatus.

3. The radio communication apparatus according to claim 1, wherein the selecting circuitry selects, when there are a plurality of sets of mobile terminal apparatuses, the set of mobile terminal apparatuses, based on an additional scheduling criterion in addition to the joint scheduling condition.

4. A radio communication method in a system that performs multicell coordinated transmission in a downlink, comprising:
a step of selecting a set of mobile terminal apparatuses whose interference is cancelable from a plurality of mobile terminal apparatuses when a plurality of radio base station apparatuses perform joint scheduling using interference cancelling capability information fed back from each mobile terminal apparatus; and
a step of performing joint scheduling, by circuitry, for the set of selected mobile terminal apparatuses,
wherein the set of selected mobile terminal apparatuses is selected based on an interference cancelling capability of each mobile terminal apparatus,
a size of a coordination unit of the multicell coordinated transmission in the downlink is dynamically adjusted to cancel the interference, the size of the coordination unit corresponding to a number of radio base stations targeted for joint scheduling, and
when the set of mobile terminal apparatuses does not meet a joint scheduling condition, the size of the coordination unit is reset and reduced by at least one.

5. The radio communication method according to claim 4, wherein the set of mobile terminal apparatuses is selected based on a spatial signal separation capability of each mobile terminal apparatus.

6. The radio communication method according to claim 4, wherein when there are a plurality of sets of mobile terminal apparatuses, the selected set of mobile terminal apparatuses is selected based on an additional scheduling criterion in addition to the joint scheduling condition.

7. The radio communication apparatus according to claim 1, wherein the selecting circuitry selects the set of mobile terminal apparatuses based on the interference canceling capability of each mobile terminal apparatus to tolerate delay.

8. The radio communication method according to claim 4, wherein the set of mobile terminal apparatuses is selected based on the interference cancelling capability of each mobile terminal apparatus to tolerate delay.

* * * * *

UNITED STATES PATENT AND TRADEMARK OFFICE
CERTIFICATE OF CORRECTION

PATENT NO. : 8,879,468 B2
APPLICATION NO. : 13/190795
DATED : November 4, 2014
INVENTOR(S) : Benjebbour et al.

Page 1 of 1

It is certified that error appears in the above-identified patent and that said Letters Patent is hereby corrected as shown below:

On the title page, Item [73], should read:

--NTT DOCOMO, INC., Tokyo, (JP)--

Signed and Sealed this
Third Day of March, 2015

Michelle K. Lee
*Deputy Director of the United States Patent and Trademark Office*